United States Patent [19]

Ikemura et al.

[11] Patent Number: 4,572,282
[45] Date of Patent: Feb. 25, 1986

[54] VENTILATION SYSTEM FOR BUILDING

[75] Inventors: Akio Ikemura, Kurobe; Minoru Kajiki, Toyama, both of Japan

[73] Assignee: Yoshida Kogyo K.K., Tokyo, Japan

[21] Appl. No.: 543,603

[22] Filed: Oct. 20, 1983

[30] Foreign Application Priority Data

Oct. 20, 1982 [JP] Japan .................. 57-184270

[51] Int. Cl.⁴ ............................. F28D 19/00
[52] U.S. Cl. ........................ 165/54; 98/33.1; 165/7
[58] Field of Search .............. 98/33 R, 40 C, 88 R, 98/94 R; 165/8, 54

[56] References Cited

U.S. PATENT DOCUMENTS

| | | | |
|---|---|---|---|
| 1,038,625 | 9/1912 | Mies | 165/54 X |
| 1,890,521 | 12/1932 | Mack | 165/54 |
| 2,074,622 | 3/1937 | Sargent et al. | 165/54 X |
| 3,146,044 | 8/1964 | Sacks | 165/54 X |
| 3,977,466 | 8/1976 | Johansson | 98/33 R |
| 4,203,487 | 5/1980 | Gartner | 98/40 C X |
| 4,300,441 | 11/1981 | Dicks | 98/40 C |
| 4,458,745 | 1/1984 | Gartner | 98/40 C |

FOREIGN PATENT DOCUMENTS 578157 7/1976 Switzerland .............. 165/54

Primary Examiner—Harold Joyce
Attorney, Agent, or Firm—Hill, Van Santen, Steadman & Simpson

[57] ABSTRACT

A ventilation system comprises a window unit with a rectangular window frame having a hollow interior constituting a flow passage for air, and a ventilator held in fluid communication with the hollow interior of the window frame. The ventilator has a built-in heat exchanging element which effects a heat exchange between fresh air and foul air during operation. The window frame has an integral pipeline disposed in the hollow interior of the window frame at the interior side of the window unit for the passage therethrough of a heat-transferring medium. The heat-transferring medium flowing through the pipeline gives up heat to, or extracts heat from the air channeled through the flow passage in the window frame prior to or after the air's being introduced into the ventilator. Thus, the efficiency of heat exchange is considerably increased.

22 Claims, 16 Drawing Figures

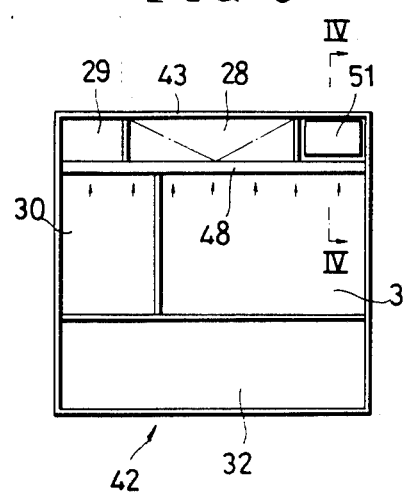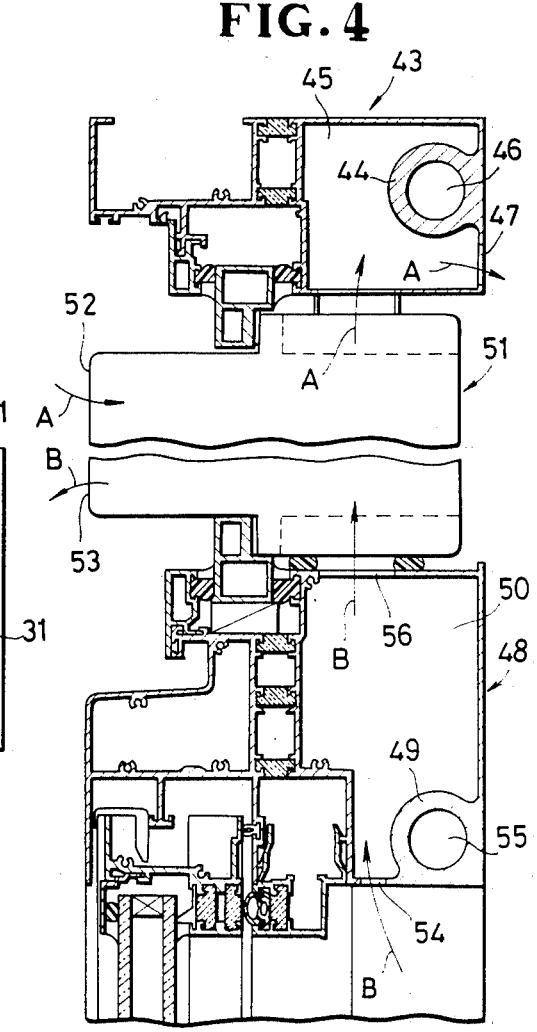

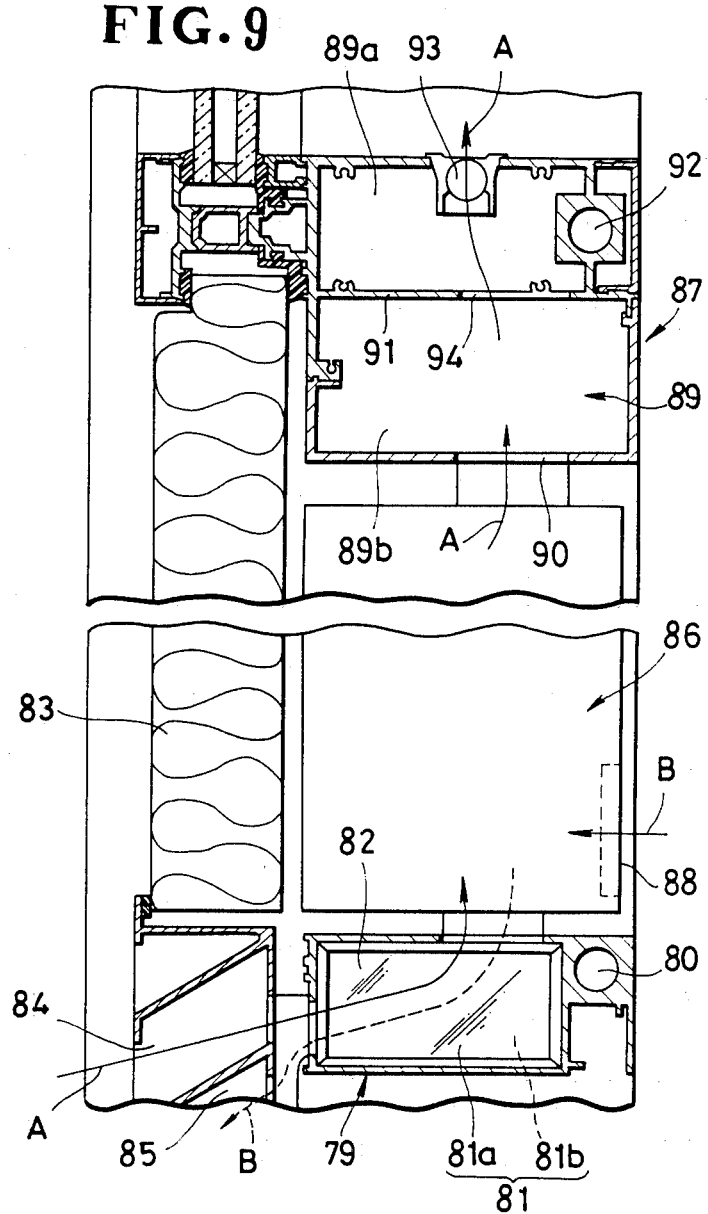

VENTILATION SYSTEM FOR BUILDING

BACKGROUND OF THE INVENTION

1. Field of the Invention

The present invention relates generally to a ventilation system for a building, and more particularly to such a ventilation system including a ventilator having a built-in heat exchanger.

2. Prior Art

There are known various ventilation systems for buildings of the type described which include a ventilator having a built-in heat exchanger. These known ventilation systems have effected a heat exchange simply between the inside air and the outside air while they flow through the ventilator, but have not rerealized a heat exchange between a heat-transferring medium flowing through hollow window frames of the building and air introduced into or discharged from the ventilator. Such known systems are disadvantageous in that the efficiency of heat exchange between the two media is relatively low, and the distribution of airflows in a room is irregular, so that the room interior becomes uncomfortable.

SUMMARY OF THE INVENTION

An object of the present invention is to provide a ventilation system for a building, which provides a higher heat exchanging efficiency and a uniform distribution of airflows in a room, and hence can maintain the interior room air in comfortable conditions.

Another object of the present invention is to provide a ventilation system which realizes a heat exchange between a heat-transferring medium flowing through hollow window frames of a building and air brought into or driven out from a ventilator having a built-in heat exchanging element.

According to the present invention, a ventilation system comprises a rectangular window frame having a hollow interior constituting a flow passage for air, and a ventilator held in fluid communication with the hollow interior of the window frame. The ventilator has a built-in heat exchanging element which effects a heat exchange between fresh air and foul air during operation. A pipeline is integral with the window frame and disposed in the hollow interior of the window frame for the passage therethrough of a heat-transferring medium. The heat-transferring medium flowing through the pipeline gives up heat to or extracts heat from the air channeled through the flow passage in the window frame prior to or after the air's being introduced into the ventilator. Thus, the efficiency of heat exchange is considerably increased.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 3 is a view similar to FIG. 1, showing another embodiment;

FIG. 4 is an enlarged fragmentary cross-sectional view taken along line IV—IV of FIG. 3;

FIG. 9 is an enlarged fragmentary cross-sectional view taken along line IX—IX of FIG. 8;

DETAILED DESCRIPTION

Figure 1:
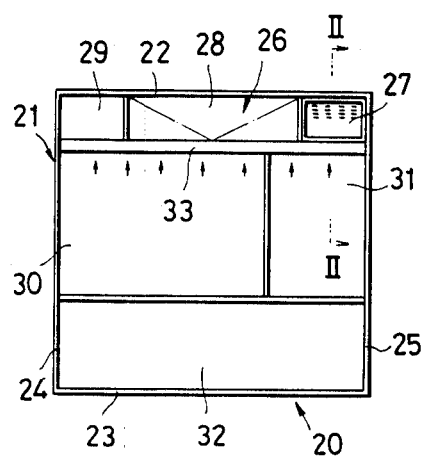
FIG. 1 is a schematic front elevational view of a window unit of a building incorporating a ventilation system according to the present inventiion, the view showing the window unit as seen from the interior of a room.
Figure 2:
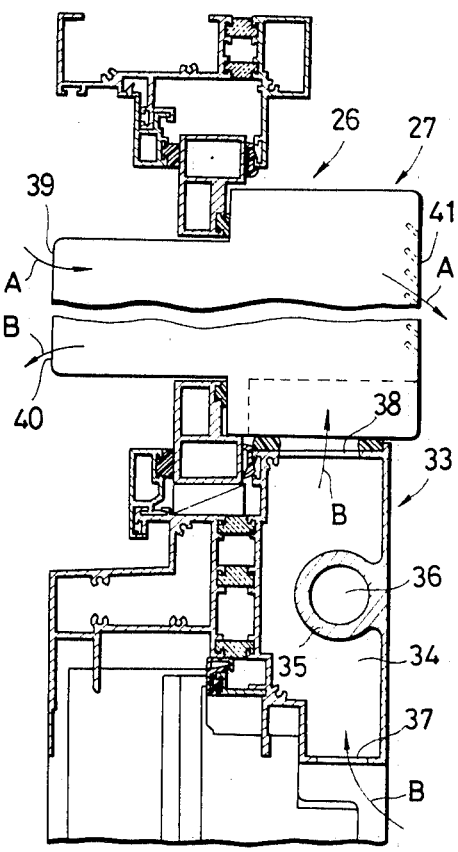
FIG. 2 is an enlarged fragmentary cross-sectional view taken along line II—II of FIG. 1.

FIGS. 1 and 2 show a ventilation system which comprises a window unit 20 including a rectangular window frame 21 mounted in an opening in a building (not shown). The window frame 21 has a pair of top and bottom horizontal frame members 22, 23, and a pair of vertical frame members 24, 25 interconnecting the horizontal frame members 22, 23. The window unit 20 has a transom window or fanlight portion 26 and a ventilator 27 disposed in the fanlight portion 26 at the upper right corner of the window frame 21, the ventilator 27 having a built-in heat exchanging element (not shown). A casement window 28 is disposed adjacent to the ventilator 27 and is pivotable to project into the interior of a room. The window unit 20 further has a small fixed window 29 disposed in the fanlight portion 26 at the upper left corner of the window frame 21, and a pair of fixed and slidable windows 30, 31 disposed below the fanlight portion 26 in close juxtaposition. A panel member 32 is disposed below the windows 30, 31.

As shown in FIG. 2, the window frame 21 has a transom or an intermediate horizontal frame member 33 which defines the fanlight portion 26 together with the top horizontal frame member 22, and respective upper portions of the vertical frame members 24, 25 (FIG. 1). Each of the frame members 22-25, 33 is a thermally insulated frame member comprising a pair of interior and exterior frame pieces interconnected by connectors made of a thermally insulating material. The frame member 33 is in the shape of a duct having a hollow interior 34 and has a pipe 35 formed integrally with an interior sidewall of the frame member 33 and projecting therefrom into the hollow interior 34. The pipe 35 extends along the length of the frame member 33 and defines a flow passage 36 for a heat-transferring medium (warm water in winter and cold water in summer). The hollow interior 34 constitutes a flow passage for air. The frame member 33 further has, along the length thereof, a series of air intake ports or slots 37 (only one shown) defined in a lower wall of the frame member 33 at equal intervals. The area of the respective air slots 37 preferably increases progressively in the direction away from the ventilator 27, so that air can be brought from the room uniformly through the air slots 37 into the hollow interior or the flow passage 34 in the frame member 33. An air discharge opening 38 is defined in an upper wall of the frame member 33 for discharging the air from the flow passage 34 in the frame member 33.

Figure 11:
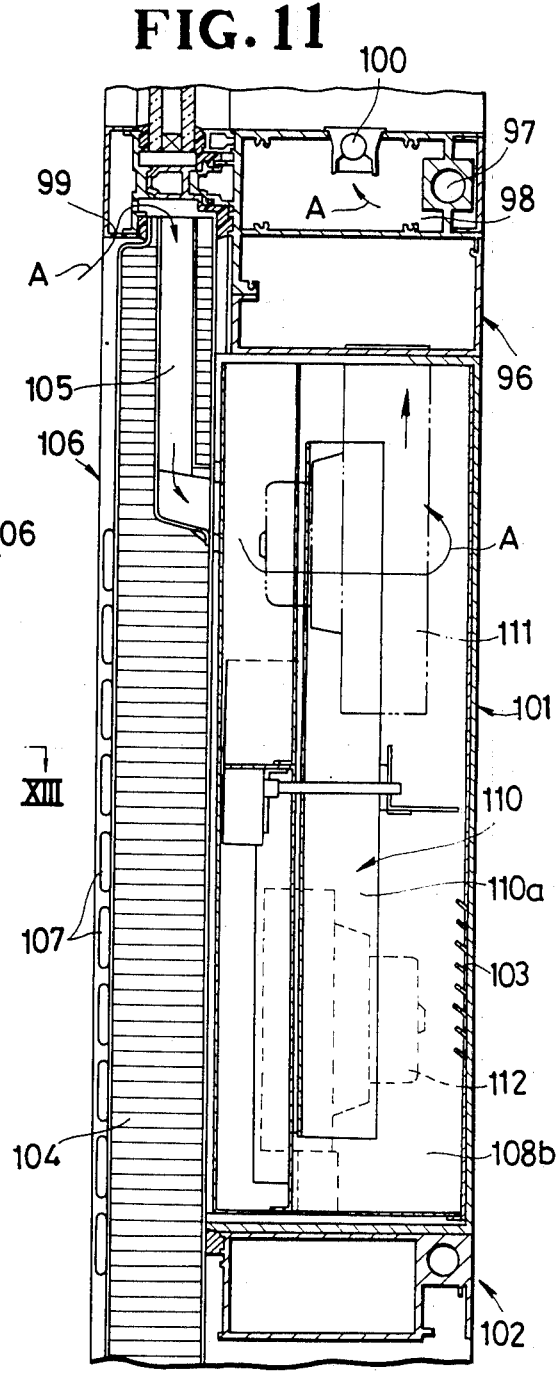
FIG. 11 is an enlarged cross-sectional view taken along line XI—XI of FIG. 10.
Figure 12:
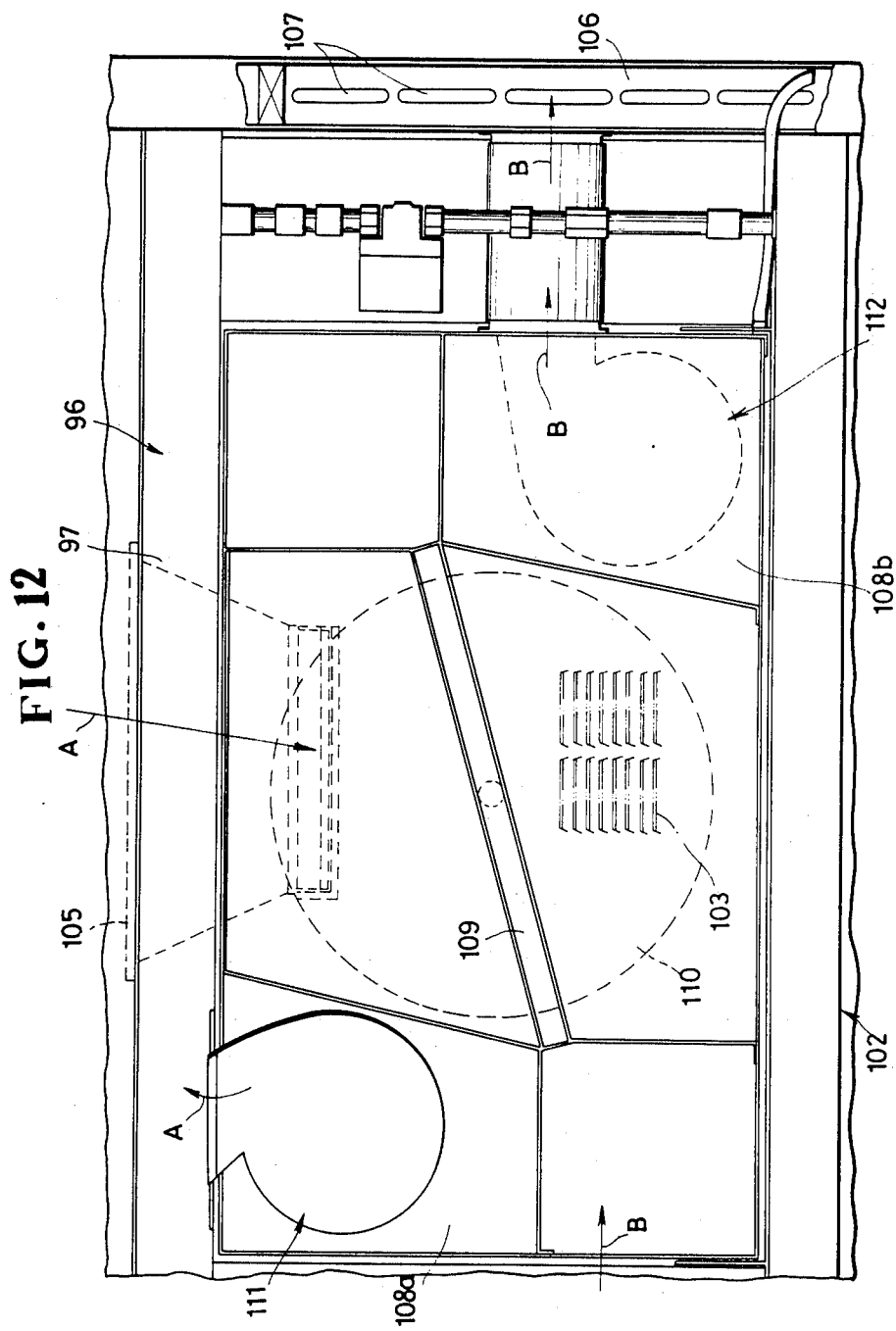
FIG. 12 is an enlarged fragmentary front elevational view of a portion of FIG. 10, parts being taken away for clarity.
Figure 13:
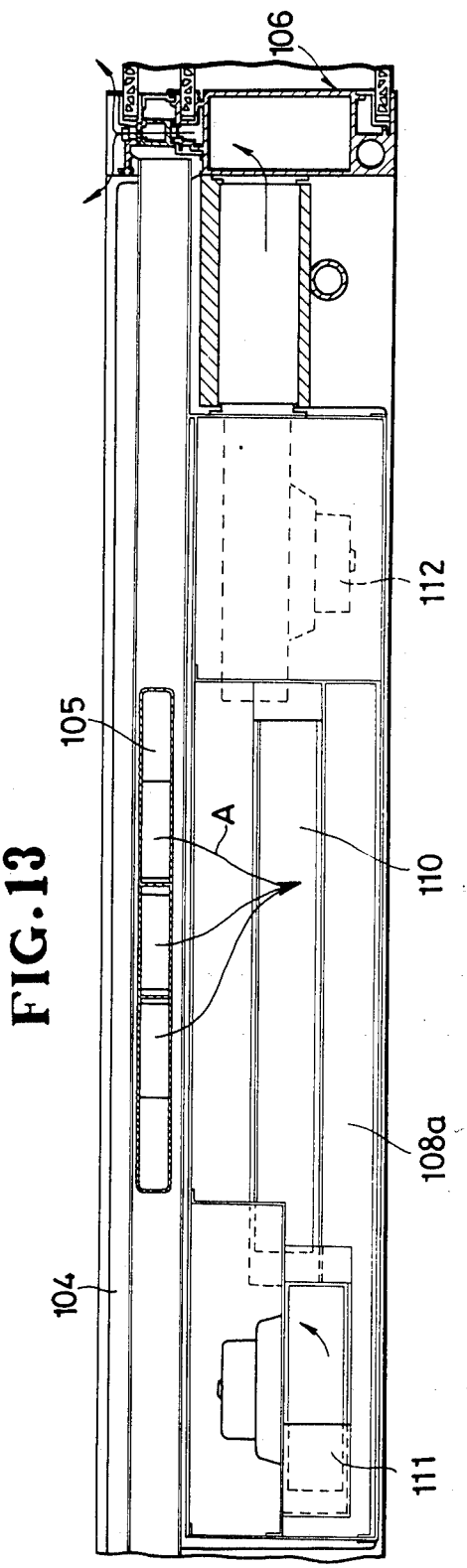
FIG. 13 is an enlarged cross-sectional view taken along line XIII—XIII of FIG. 10.

The ventilator 27 is disposed on the upper wall of the frame member 33 and is held in fluid communication with the flow passage 34 in the frame member 33 through the opening 38. The heat-exchanging element built in the ventilator 27 is of the type which can exchange both sensitive heat energy and latent heat energy. The ventilator 27 further has, on the exterior side, an air inlet port 39 and an air outlet port 40 opening to the atmosphere, respectively, for bringing fresh air into the ventilator 27 and for discharging four air from the ventilator 27. The ventilator 27 also has, on the interior side, an air outlet port 41 opening to the room interior for driving fresh air into the room interior. The internal structure of the ventilator 27 is described hereinafter in detail (FIGS. 11-13).

With this arrangement, fresh air introduced through the inlet port 39 into the ventilator 27 is subjected to heat exchanging process by being contacted with the heat-exchanging element and then is driven out of the ventilator 27 through the outlet port 41 into the room interior. Foul air is introduced through the air slots 37 into the flow passage 34 in the frame member 33 and then is brought into the ventilator 27, during which time the heat-transferring medium flowing through the passage 36 will through the medium of the pipe 35 give up heat to, or extract heat from the foul air channeled through the flow passage 34 in the hollow frame member 33. In the ventilator 27, the foul air flows parallel to the fresh air, when heat is exchanged between the two media in counter current. The four air is finally discharged from the ventilator 27 through the outlet port 40 to the outside of the room. The directions of flow of the fresh air and the foul air are indicated respectively by arrows A and B in FIG. 2.

FIGS. 3 and 4 show a modified ventilation system including a window unit 42 which is similar to the one shown in FIG. 1 with the exception that the window unit 42 comprises a top horizontal frame member 43 having an interior duct portion 45, as shown in FIG. 4. The frame member 43 has a pipe 44 formed integrally with an interior sidewall of the frame member 43 and extending in the hollow interior 45 in the frame member 43 along the length thereof. The pipe 44 defines a flow passage 46 for the heat-transferring medium, and the hollow interior 45 constitutes a flow passage for air. The frame member 43 has a series of air outlet ports 47 (only one shown in FIG. 4) defined in the interior sidewall and extending along the length of the same at equal intervals. An intermediate hollow horizontal frame member 48 has an integral pipe 49 disposed in the hollow interior 50 at the lower right corner of the frame member 48. A ventilator 51 is disposed between the top and intermediate horizontal members 43, 48 and is held in fluid communication with the hollow interiors 45, 50 of the frame members 43, 48. The ventilator 51 has on its exterior side an air inlet port 52 and an air outlet port 53 opening to the outside air.

With this arrangement, fresh air introduced through the inlet port 52 into the ventilator 51 is subjected to a heat exchanging process and then is forced into the flow passage 45 in the top frame member 43 where heat is received, or is extracted by the heat-transferring medium flowing through the passage 46 in the pipe 44. Finally, the fresh air is discharged from the top frame member 43 through the outlet port 47 evenly into the room interior. Foul air is introduced through the air slots 54 (only one shown in FIG. 4) in the intermediate frame member 48 into the hollow interior 50 of the same where the heat-transferring medium flowing through a passage 55 in the pipe 49 gives up heat to, or extracts heat from the foul air channeled through the intermediate frame member 48. The foul air then passes through an aperture 56 in the frame member 48 into the ventilator 51 where it is subjected to an additional heat exchanging process. Thereafter, the foul air is discharged from the ventilator 51 through the outlet port 53.

Figure 5:
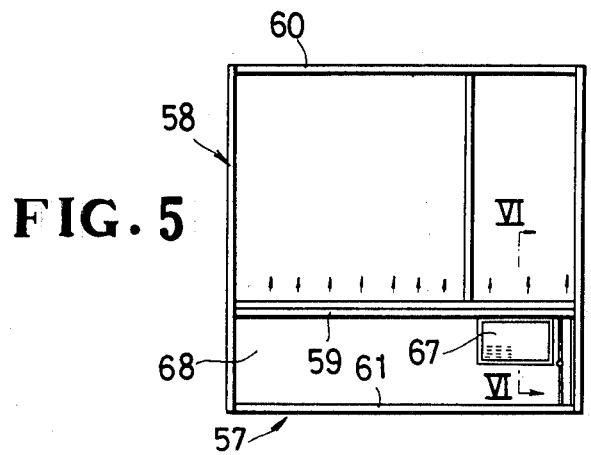
FIG. 5 is a view similar to FIG. 1, showing a further embodiment.
Figure 6:
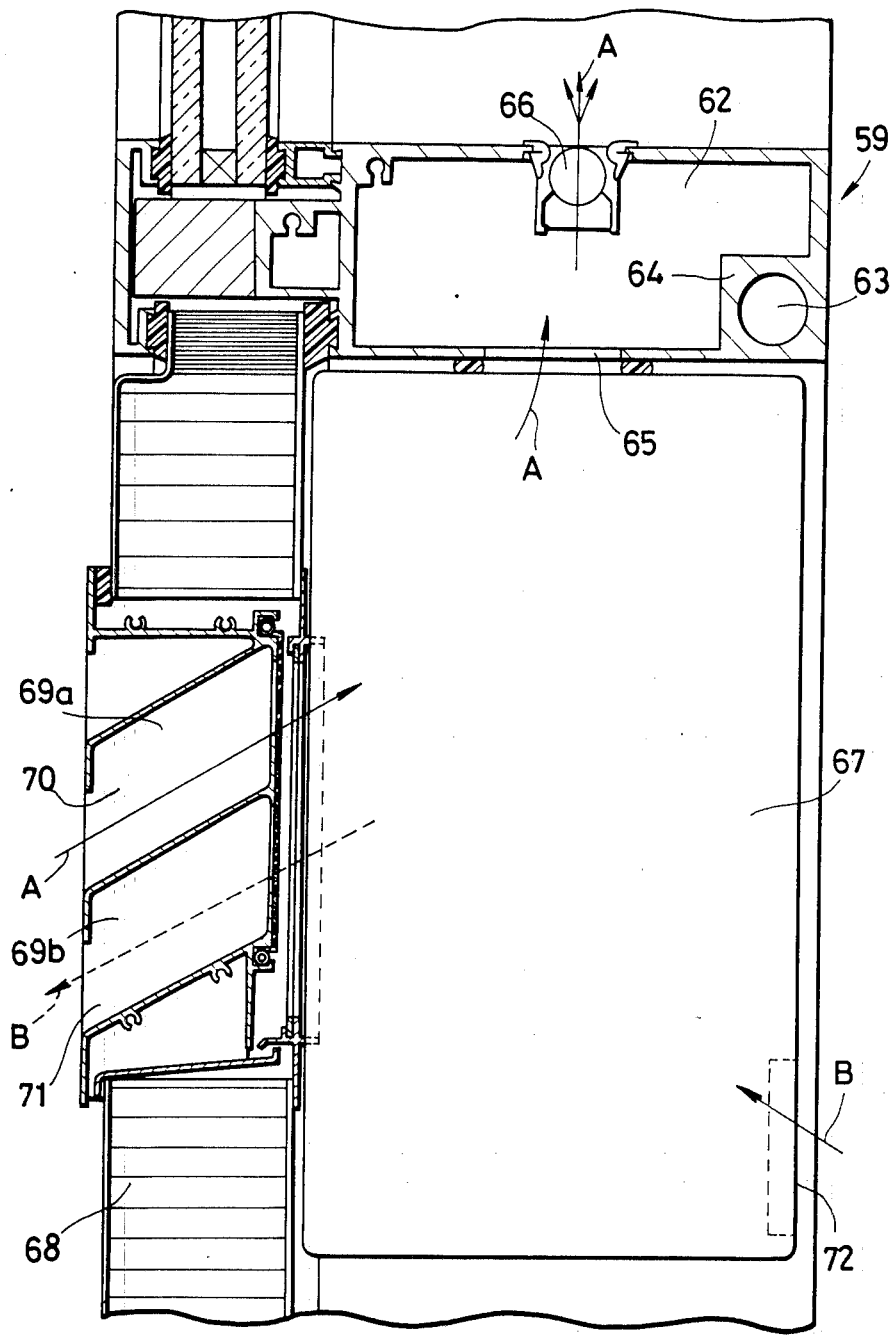
FIG. 6 is an enlarged cross-sectional view taken along line VI—VI of FIG. 5.
Figure 10:
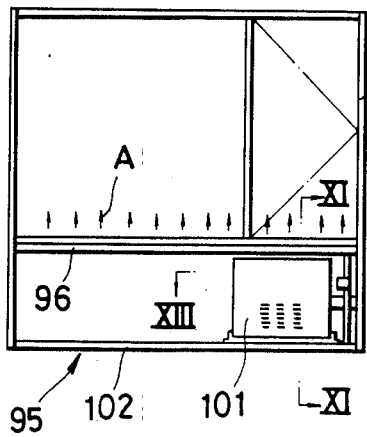
FIG. 10 is a view similar to FIG. 1, showing another embodiment.

FIGS. 5 and 6 show another modified ventilation system in which a window unit 57 includes a window frame 58 having an intermediate horizontal frame member 59 extending between a top and a bottom horizontal frame member 60 and 61. As shown in FIG. 6, the intermediate frame member 59 has a hollow interior 62 constituting a flow passage for air, and a flow passage 63 for a heat transferring medium extending along the flow passage 62, the passage 63 being defined by a pipe 64 formed integrally with and inside the frame member 59. The frame member 59 has in its lower wall an air inlet port 65 held in fluid communication with a ventilator 67 and in its upper wall a series of air outlet ports 66 (only one shown) disposed along the length of the frame member 59 at equal intervals. Each air outlet port 66 preferably comprises a diffuser for effecting uniform distribution of air discharged therefrom. The ventilator 67 is disposed between the intermediate and bottom horizontal frame members 59, 61 and is held in fluid communication with the the flow passage 62 in the intermediate horizontal frame member 59. A panel member 68 is disposed on the exterior side of the ventilator 67 and extends between the intermediate and bottom horizontal frame members 59, 61. The panel member 68 has a pair of parallel separated air channels 69a, 69b having at one end an air inlet port 70 and an air outlet port 71, and held at the opposite end in fluid communication with the ventilator 67. The ventilator 67 has an air inlet port 72 opening to the room interior for introducing therethrough foul air into the ventilator 67.

With this arrangement, fresh air introduced through the air inlet port 70 into the channel 69a flows into the ventilator 67 where it is subjected to a heat exchanging process. Then the fresh air is forced into the flow passage 62 in the frame member 59 where it is cooled or heated by the heat-transferring medium flowing through the flow passage 63 in the pipe 64. Thereafter, the fresh air is discharged from the outlet ports or diffusers 66 into the room interior. Foul air introduced through the inlet port 72 into the ventilator 67 is discharged therefrom through the air outlet channel 69b to the outside of the room after being subjected to heat exchange in the ventilator 67.

Figure 7:
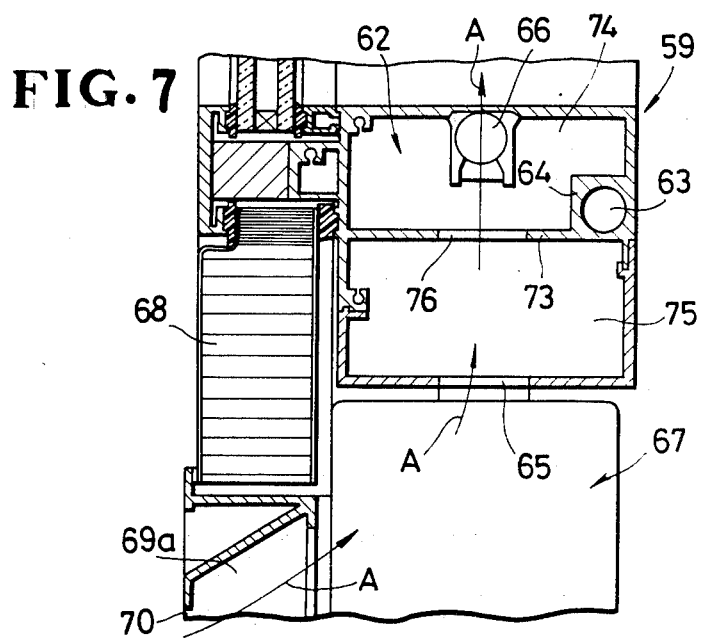
FIG. 7 (appearing with FIG. 5) is a view similar to FIG. 6, showing a modification.

The intermediate horizontal frame member 59 may have a partition wall 73 dividing the hollow interior or the flow passage 62 into two separate air chambers 74, 75, as shown in FIG. 7. The pipe 64 is disposed in the upper chamber 74 which communicates with the lower chamber 75 through an aperture 76 in the partition wall 73. With this arrangement, an increased amount of heat energy can be given up to, or extracted from the fresh air as it flows successively through the lower and upper air chambers 75, 74. Another advantage attained by such arrangement is that streams of the fresh air discharged from the outlet ports 66 have the same velocity.

Figure 8:
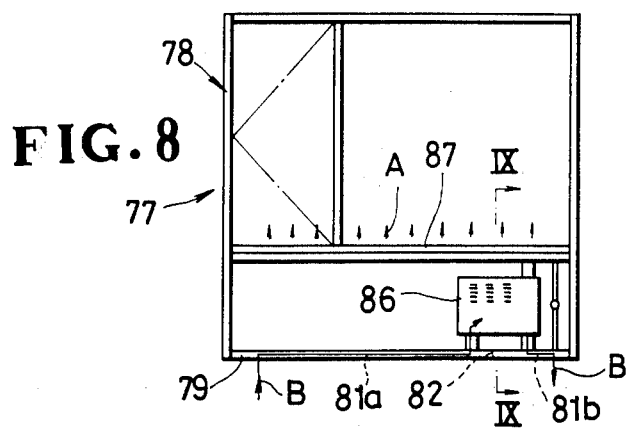
FIG. 8 (appearing with FIG. 5) is a view similar to FIG. 1, showing a still further embodiment.

A modified ventilation system shown in FIGS. 8 and 9 is similar to the system shown in FIG. 7 but differs therefrom in that a window unit 77 comprises a window frame 78 including a hollow bottom horizontal frame member 79. The frame member 79 has a flow passage 80 for a heat-transferring medium and an airflow passage 81 adjacent to the passage 80. The flow passage 80 is divided into two chambers 81a, 81b by a vertical partition wall or block 82, one of the chambers 81a being longer than the other 81b. A panel member 83 has a pair of parallel separated, air intake and discharge channels 84, 85 opening at one end to the outside air and held at the opposite side in fluid communication with the chambers 81a, 81b, respectively. A ventilator 86 is disposed between the bottom horizontal frame member 79 and a hollow intermediate horizontal frame member 87. The ventilator 86 has on its interior side an inlet port 88 and is held in fluid communication with both the intermediate frame member 87 via an intake opening 90 in a lower wall of the frame member 87, and the chambers 81a, 81b in the bottom frame member 79. The hollow interior 89 of the frame member 87 is divided into two chambers 89a, 89b by a horizontal partition wall 91. The frame member 87 further has a flow passage 92 adjacent to the upper chamber 89a for the heat-transferring medium, and a series of air outlet ports 93 (only one shown in FIG. 9) along the length of an upper wall of the frame member 8 at equal intervals. The partition wall 91 has an aperture 94 communicating with the chambers 89a, 89b.

With this arrangement, fresh air flowing through the air intake channel 84 receives heat from, or has heat extracted from the heat-transferring medium channeled through the passage 80 in the frame member 79 as it flows through the longer chamber 81a in the frame member 79, prior to the heat exchange between itself and a heat-exchanging element (not shown) in the ventilator 86. The fresh air further is cooled or heated by the heat-transferring medium flowing through a passage 92 as it flows through the chamber 89a. Thereafter, the fresh air is discharged uniformly from a set of outlet ports 93 into the room interior. Foul air brought through an inlet port 88 into the ventilator 86 is immediately discharged from the discharge channel 85 to the outside of the room through the shorter chamber 81b in the bottom frame member 79.

FIGS. 10 to 13 show another modified ventilation system. This system comprises a window frame 95 including a hollow intermediate horizontal frame member 96 which has on its interior side a passage 97 for a heat-transferring medium and an airflow passage 98 adjacent to the passage 97. The horizontal frame member 96 also has on its exterior side a series of air inlet ports 99 (only one shown in FIG. 11) along the length thereof at equal intervals. A series of air outlet ports 100 (only one shown in FIG. 11) is defined on the interior side of the frame member 96 along the length thereof at equal intervals. A ventilator 101 is disposed between the intermediate frame member 96 and a hollow bottom horizontal frame member 102. The ventilator 101 is held in fluid communication with the flow passage 98 and has an air inlet port 103 opening to the room interior. A panel member 104 is disposed on the exterior side of the ventilator 101 between the intermediate and bottom frame members 96, 102. The panel member 104 has an air duct 105 communicating at opposite ends with the air inlet ports 99 in the frame member 96 and the ventilator 101. A hollow vertical frame member 106 has on its exterior side a series of air outlet ports 107 along the length thereof at equal intervals.

The ventilator 101 has upper and lower chambers 108a, 108b separated by a partition wall 109, as shown in FIG. 12. A rotor 110 is mounted on a drive shaft for corotation therewith and extends across the partition wall 109 into the chambers 108a, 108b. The rotor 110 has a heat-exchanging element 110a (FIG. 11) which is capable of exchanging both sensitive heat and latent heat at the same time. The heat-exchanging element 110a effects a heat exchange between fresh air from the outside of the room and foul air from the room interior upon rotation of the rotor 110. The ventilator 101 also has a blower or fan 111 disposed in the upper chamber 108a for bringing air into the room interior, and a blower 112 disposed in the lower chamber 108b for discharging air outside the room.

With this arrangement, fresh air introduced through the air inlet ports 99 in the frame member 96 flows through the duct 105 into the upper chamber 108a of the ventilator 101 where it is subjected to a heat exchanging process by being contacted with the heat-exchanging element 110a. The fresh air is further cooled or heated by the heat-transferring medium flowing through the passage 97 as it flows through the passage 98 in the frame member 96. Thereafter, the fresh air is discharged uniformly from the outlet ports 100 into the room interior. Foul air flows through the inlet opening 103 into the lower chamber 108b of the ventilator 101 where the heat-exchanging element 110a effects a heat exchange between itself and the foul air. The foul air is discharged from the outlet ports 107 in the vertical frame member 106 to the outside of the room.

Figure 14:
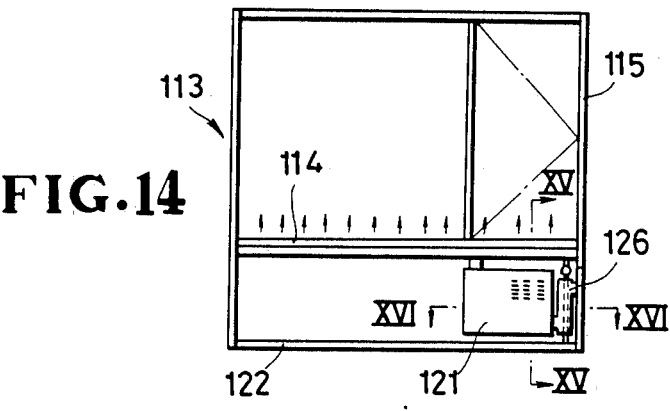
FIG. 14 is a view similar to FIG. 1, showing another embodiment.
Figure 15:
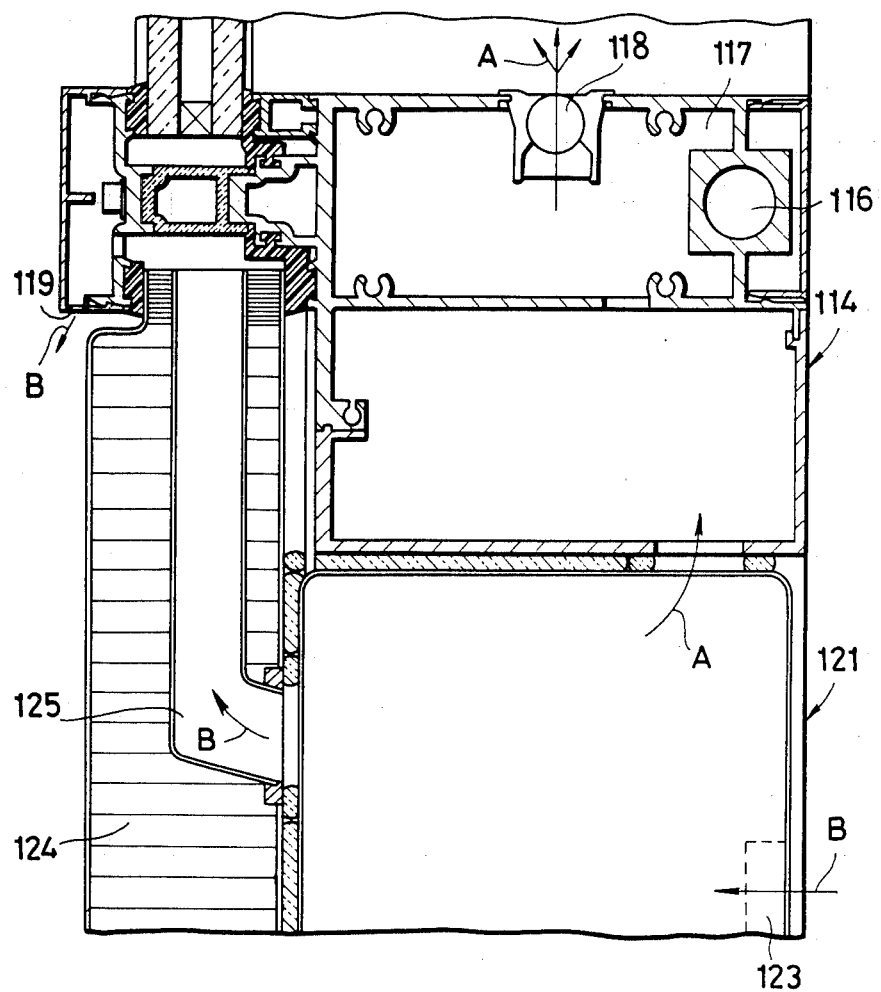
FIG. 15 is an enlarged fragmentary cross-sectional view taken along line XV—XV of FIG. 14.
Figure 16:
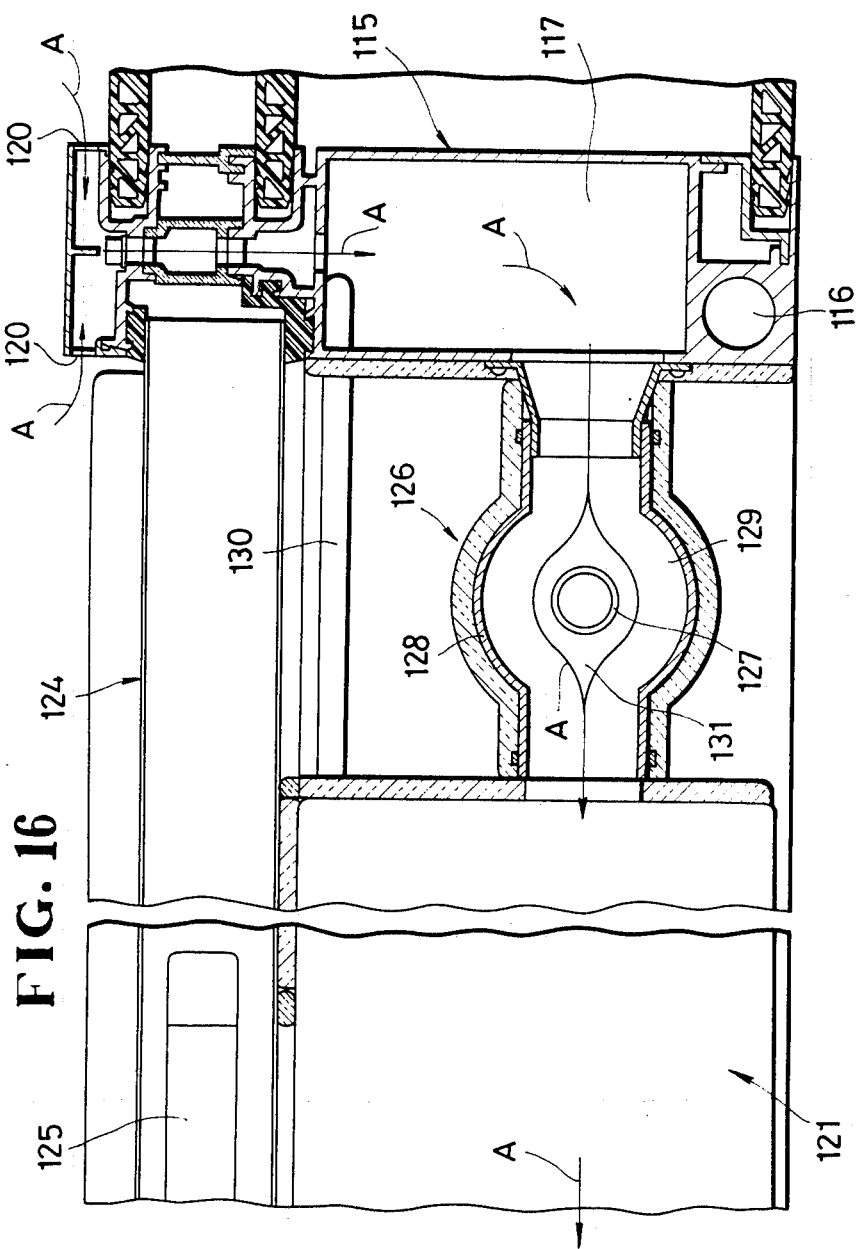
FIG. 16 is an enlarged fragmentary cross-sectional view taken along line XVI—XVI of FIG. 14.

A modified ventilation system shown in FIGS. 14 to 16 comprises a window frame 113 having a hollow intermediate horizontal frame member 114 and a hollow vertical frame member 115. Each of the frame members 114, 115 has a portion of a flow passage 116 for a heat transferring medium and a portion of an airflow passage 117 adjacent to the passage 116. The intermediate horizontal frame member 114 has a series of air outlet ports or diffusers 118 (only one shown in FIG. 15) opening to the room interior. A series of air outlet ports 119 (only one shown in FIG. 15) is further defined in the frame member 114 at equal longitudinal intervals and opens to the outside of the room. The vertical frame member 115 has on its exterior side a series of air inlet ports 120 (only two shown in FIG. 16) at equal longitudinal intervals. A ventilator 121 is disposed between the intermediate horizontal frame member 114 and a bottom horizontal frame member 122 adjacent to the vertical frame member 115. The ventilator 121 is held in fluid communication with the flow passage 117 in the frame members 114, 115, and has an air inlet port 123 opening to the room interior. A panel 124 is disposed on the exterior side of the ventilator 121 and extends between the horizontal frame members 114, 122. An air duct 125 is defined in the panel 124 and communicates at opposite ends with the air outlet ports 119 and the ventilator 121.

With this arrangement, fresh air is cooled or heated as it flows through the portion of the flow passage 117 in the vertical frame member 115, across a heat-exchanging box 126 disposed between the vertical frame member 115 and the ventilator 121, into the ventilator 121, and through the portion of the flow passage 117 in the horizontal frame member 114. The heat-exchanging box 126 is composed of a pipe 127 for the passage therethrough of the heat-transferring medium and a jacket or cover 128 surrounding the pipe 127, there being defined between the pipe 127 and the jacket 128 an annular chamber 129. The fresh air thus subjected to heat-exchange discharged from the outlet ports 118 into the room interior. Foul air is introduced through the air inlet port 123 into the ventilator 121 for being subjected to heat-exchange, and then flows through the air duct 125 to outside the room.

Preferably, the ventilator 121 and the heat-exchanging box 126 are covered with a layer of thermally insulating material. Water condensate is discharged through a draining pipe 130 to outside the room. As shown in FIG. 16, the pipe 127 has radiator fins 131 for increasing the efficiency of heat exchange. Throughout the embodiments mentioned above, each of the window units has a thermally insulated structure which comprises a thermally insulated window frame, a thermally insulated panel, and a pair of panes of glasses. With the window units thus construced, heat loss can be used to reduced to a minimum. The ventilation systems are very advanatageous when they are incorporated in an air temperature control system for rooms in a building. Such air temperature control system can be overcome the problem of so-colled radiation holes, i.e. a wall region of a room the temperature of which differs substantially from the average room temperature.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A combined window and ventilation system module for a building, comprising:
   (a) a window unit including a window frame having a window opening adapted to support a window, said window frame further having with it
      (1) at least one first internal passage remote from said window opening for conducting a fluid-transfering medium, and
      (2) at least one second internal passage for air remote from said window opening, and disposed in heat-exchange relationship to said first passage;
   (b) a ventilator supported by said frame and disposed adjacent to said window opening and having a heat-exchanging element disposed therein, said ventilator being also held in air flow communication with said second internal frame passage;
   (c) a fresh air inlet and a fresh air outlet disposed on the exterior and interior sides of the window unit respectively, and communicating with said second passage through said ventilator; and
   (d) a foul air inlet and a foul air outlet disposed on the interior and exterior sides of the window unit respectively and communicating with each other by a third passage extending through said ventilator independently of the flow of fresh air.

2. A combined window and ventilation system module according to claim 1, said window frame including a pair of top and bottom horizontal frame members, a pair of vertical frame members interconnecting said horizontal frame members, and an intermediate horizontal frame member extending between said top and bottom horizontal frame members, said ventilator being disposed between said intermediate horizontal frame member and one of said top and bottom horizontal frame members, said first and second internal passages being disposed within at least one of said frame members.

3. A combined window and ventilation system module according to claim 2, said intermediate horizontal frame member having at least a portion of said first and second passages.

4. A combined window and ventilation system module according to claim 3, said ventilator being disposed between said intermediate and top horizontal frame members, said top horizontal frame member having at least a portion of said first and second passages.

5. A combined window and ventilation system module according to claim 3, said intermediate horizontal frame member having said foul air inlet on the interior side of said fresh window unit.

6. A combined window and ventilation system module according to claim 3, said ventilator having said fresh air outlet on the interior side of said window unit.

7. A combined window and ventilation system module according to claim 5, said top horizontal frame member having said fresh air outlet on the interior side of said window unit, said ventilator having said fresh air inlet and said foul air outlet on the exterior side of said window unit.

8. A combined window and ventilation system module according to claim 3, said ventilator being disposed between said intermediate and bottom horizontal frame members, said bottom horizontal frame member having at least portions of said first and second passages extending along its length.

9. A combined window and ventilation system module according to claim 3, said ventilator having said foul air inlet on the interior side of said window unit.

10. A combined window and ventilation system module according to claim 3, said intermediate horizontal frame member having said fresh air outlet on the interior side of said window unit.

11. A combined window and ventilation system module according to claim 3, including a panel member disposed on the exterior side of said ventilator and extending between said intermediate and bottom horizontal frame members, said panel having means for conducting at least one of the fresh-air-to and foul-air-from said ventilator.

12. A combined window and ventilation system module according to claim 11, said panel member having said fresh air inlet on the exterior side of said window unit.

13. A combined window and ventilation system module according to claim 12, said panel member further having said foul air outlet on the exterior side of said window unit.

14. A combined window and ventilation system module according to claim 11, said ventilator having a pair of fresh air intake and foul air discharge openings respectfully communicating with said fresh air inlet and said foul air outlet on the exterior side of said window unit.

15. A combined window and ventilation system module according to claim 13, said bottom horizontal frame member having a pair of fresh air intake and foul air discharge openings respectively commuicating with said fresh air inlet and said foul air outlet on the exterior side of said window unit.

16. A combined window and ventilation system module according to claim 2, said intermediate horizontal frame member having a fresh air outlet on the interior side of said window unit, one of said vertical frame members having one of said exterior fresh air inlet and said exterior foul air outlet.

17. A combined window and ventilation system module according to claim 11, one of said vertical frame members having further portions of said first and second passages and said fresh air inlet on the exterior side of said window unit.

18. A combined window and ventilation system module according to claim 17, said intermediate horizontal frame member having said foul air outlet on the exterior side of said window unit.

19. A combined window and ventilation system module according to claim 18, said panel having an air discharge channel communicating said ventilator with said foul air outlet.

20. A ventilation system module according to claim 2, at least one of said horizontal and vertical frame members having a hollow cross-sectional interior constituting said second passage, and a pipe forming part of said first passage and disposed in said hollow interior and integral with said one frame member.

21. A ventilation system module according to claim 20, said pipe being disposed on the room-interior side of said one frame member.

22. A ventilation system module according to claim 20, said one frame member having a partition wall dividing said hollow interior into two chambers, said ventilator communicating with one of said chambers, said frame member having fresh air outlet communicating with the other chamber, said partition wall having at least one aperture communicating with both said chambers.

* * * * *